March 4, 1924.                              1,485,576
A. WENDELBURG
BRAIDING MACHINE
Filed Sept. 27, 1919       5 Sheets-Sheet 1

WITNESSES                              INVENTOR
                                   ALEX WENDELBURG
                                        BY
                                       ATTORNEYS

March 4, 1924.
A. WENDELBURG
BRAIDING MACHINE
Filed Sept. 27, 1919  5 Sheets-Sheet 2
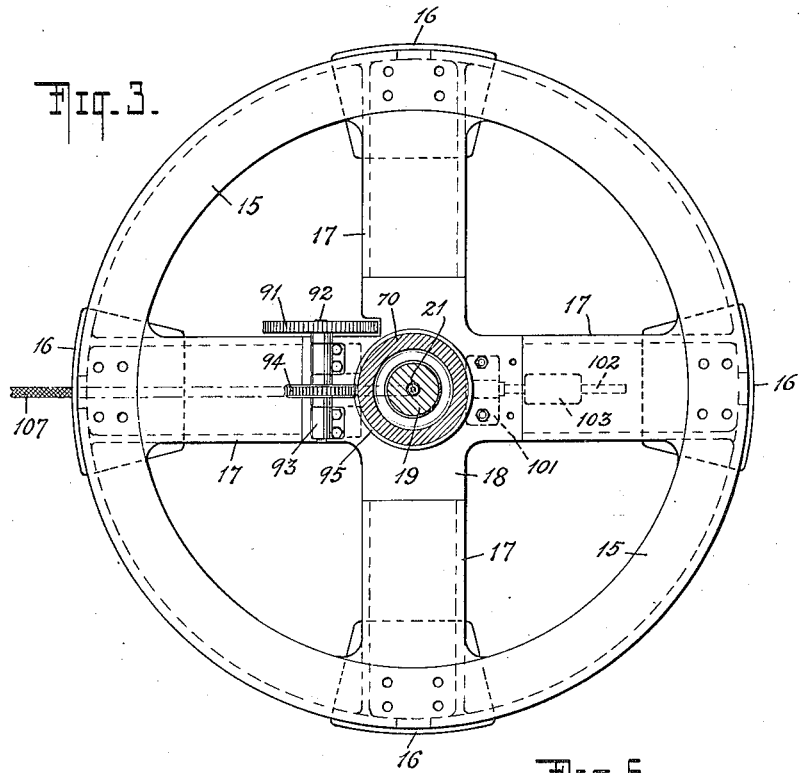
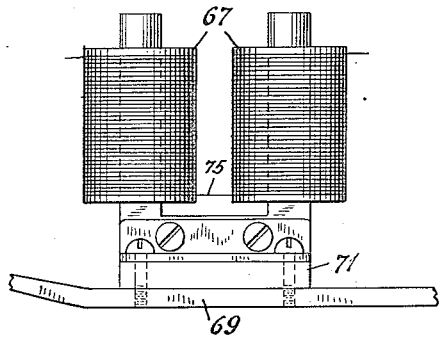
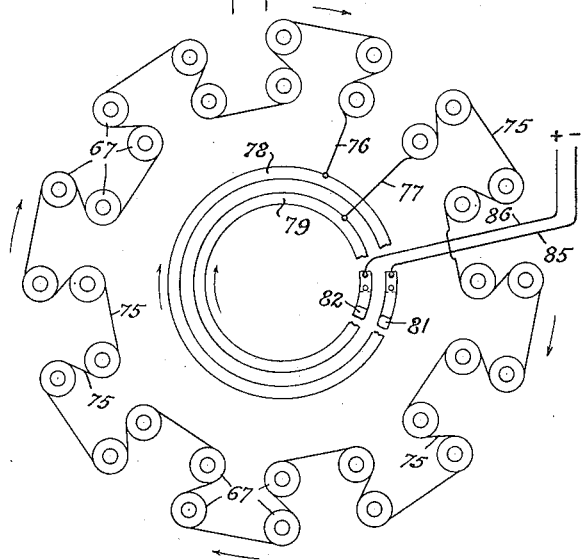
WITNESSES
INVENTOR
ALEX WENDELBURG
BY
ATTORNEYS

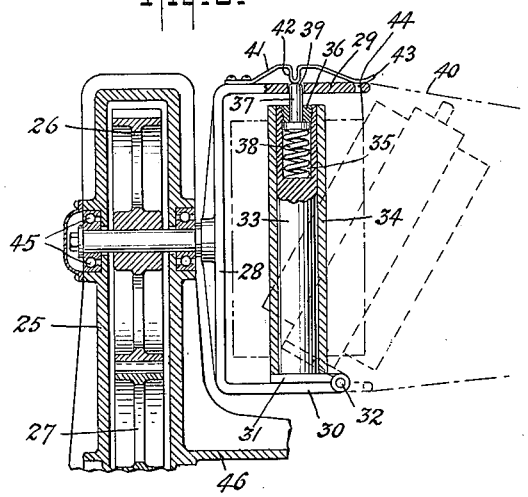
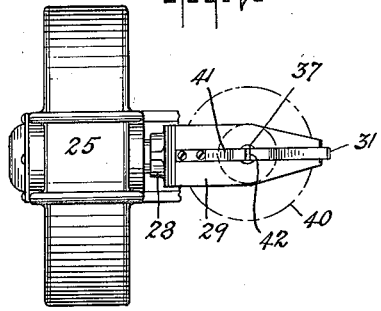
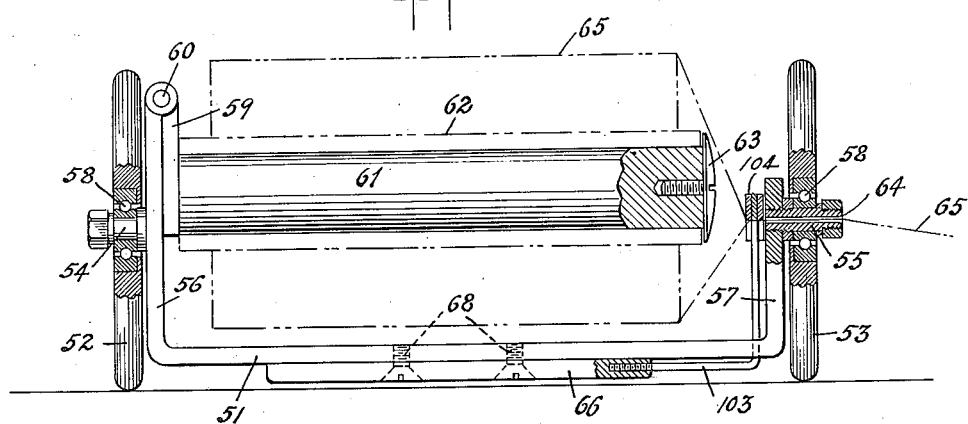
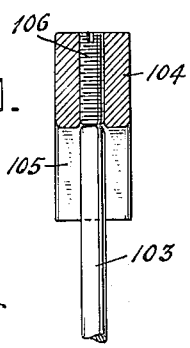
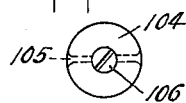

March 4, 1924.

A. WENDELBURG

BRAIDING MACHINE

Filed Sept. 27, 1919

1,485,576

5 Sheets-Sheet 4

WITNESSES
G. V. Rasmussen

INVENTOR
ALEX WENDELBURG
BY
ATTORNEYS

March 4, 1924.  
A. WENDELBURG  
BRAIDING MACHINE  
Filed Sept. 27, 1919  
1,485,576  
5 Sheets-Sheet 5

WITNESSES

INVENTOR  
ALEX WENDELBURG  
BY  
ATTORNEYS

Patented Mar. 4, 1924.

1,485,576

UNITED STATES PATENT OFFICE.

ALEX WENDELBURG, OF NEW YORK, N. Y.

BRAIDING MACHINE.

Application filed September 27, 1919. Serial No. 326,878.

*To all whom it may concern:*

Be it known that I, ALEX WENDELBURG, a citizen of the United States, and resident of the borough of Manhattan, city, county, and State of New York, have invented certain new and useful Improvements in Braiding Machines, of which the following is a specification.

My invention relates to braiding machines and has for its object to provide a machine of simplified and improved construction in which the braiding operation is carried on in a novel, efficient and economical manner. Other more specific objects will appear from the description hereinafter and the features of novelty will be pointed out in the claims.

Figure 1:
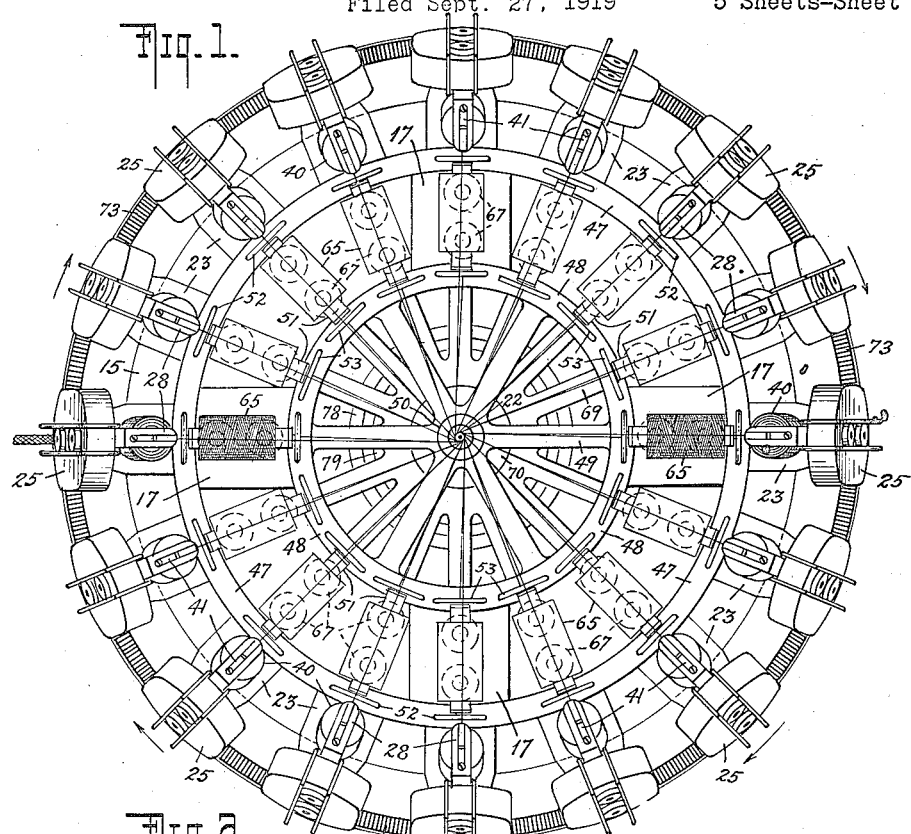
Figure 2:
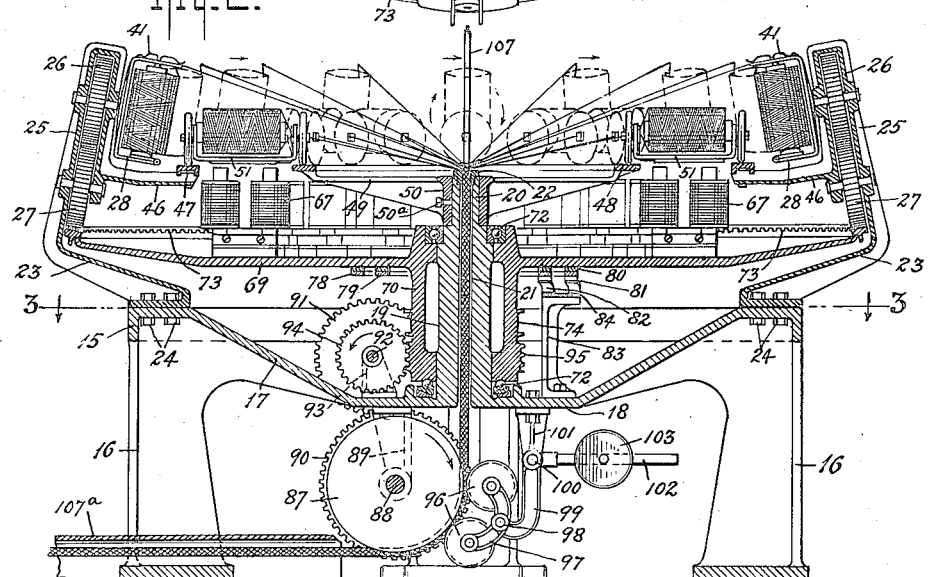
Figure 11:
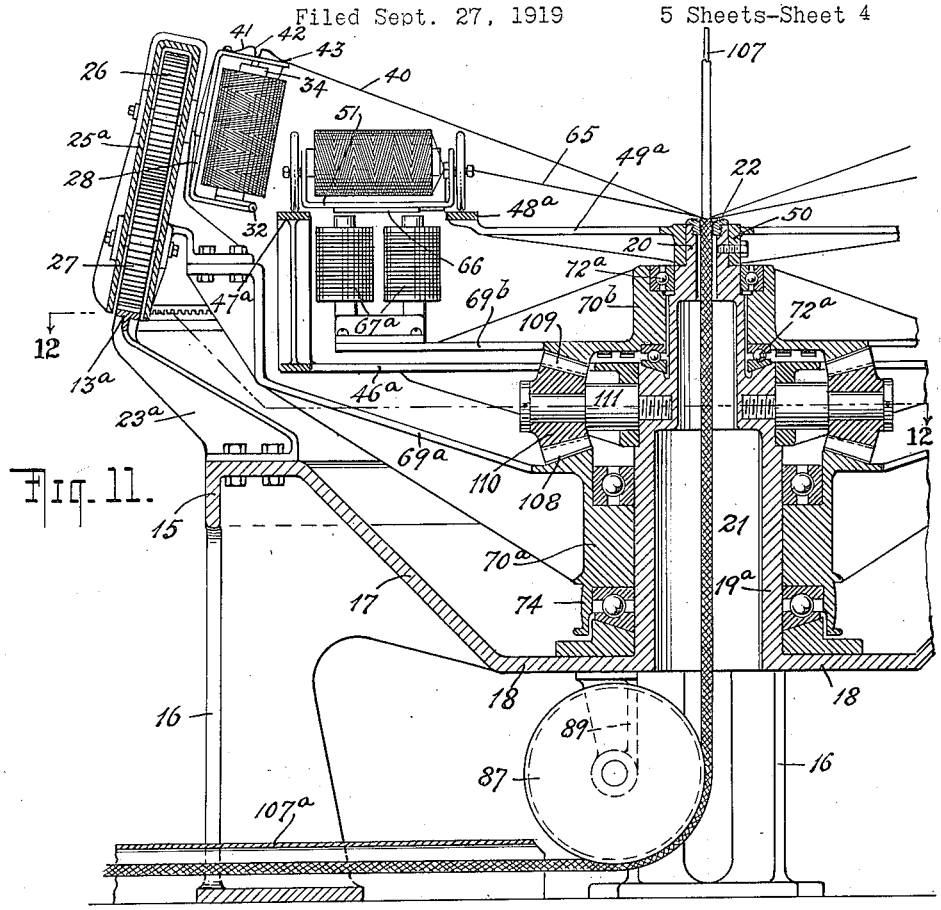
Figure 12:
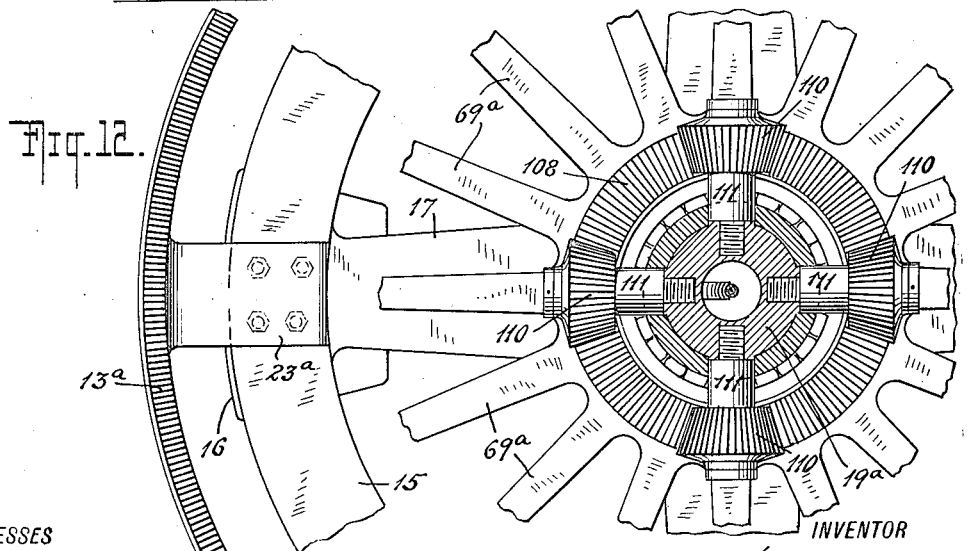
Figure 13:
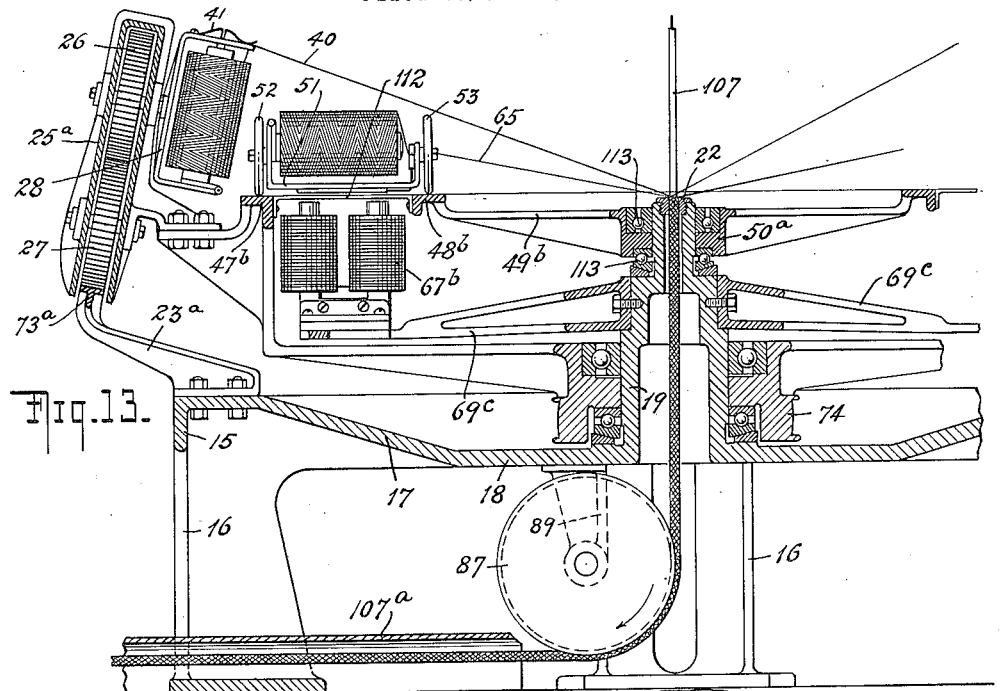
Figure 14:
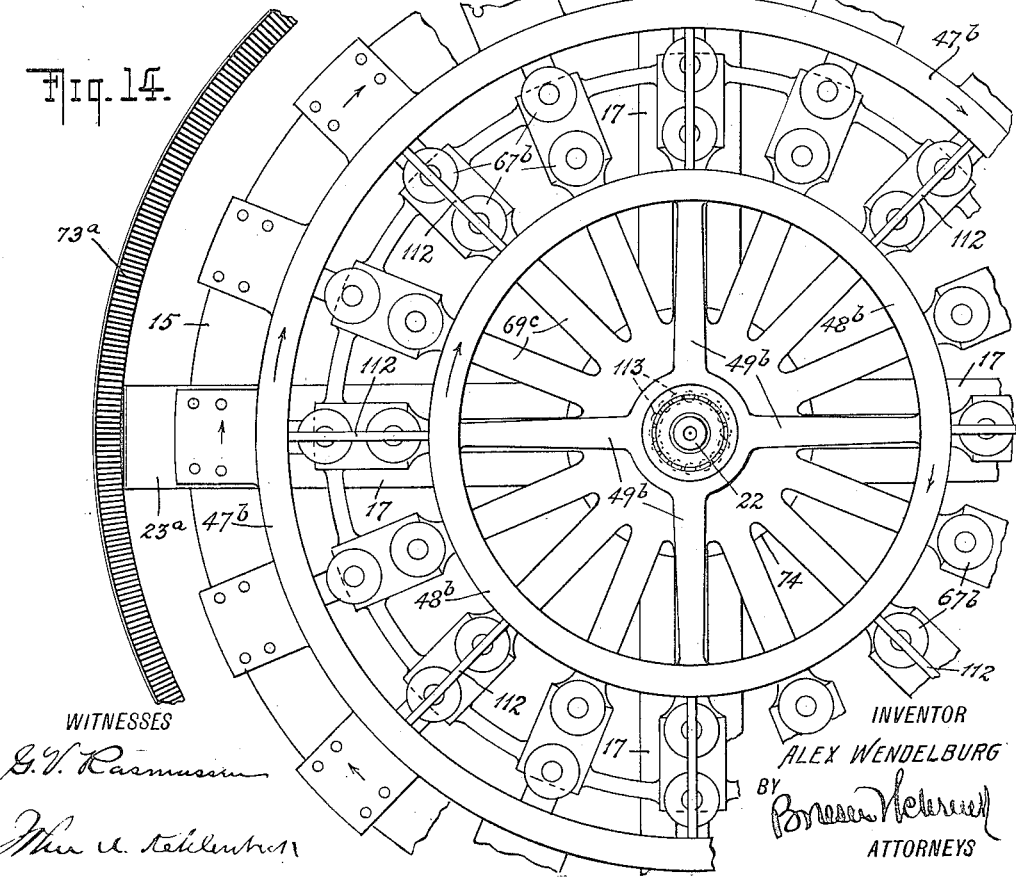

In the accompanying drawings which for illustrative and descriptive purposes and without defining the limits of the invention, show several embodiments thereof, Figure 1 is a more or less diagrammatic plan view of one form of the machine; Fig. 2 is a central vertical section thereof; Fig. 3 is a horizontal section on the line 3—3 of Fig. 2; Fig. 4 is a detail elevation of a pair of electromagnets and their mountings; Fig. 5 is a diagram of the wiring system included in the machine; Figs. 6, 7 and 8 are detail views of the spool or thread carrying devices; Figs. 9 and 10 are detail views illustrating a thread tensioning device; Fig. 11 is a fragmentary section showing another form of my machine; Fig. 12 is a fragmentary plan view thereof; and Figs. 13 and 14 are similar views respectively, illustrating still another embodiment of the invention.

In the form shown in Figs. 1 and 2, the machine comprises a suitable base 15 preferably circular in form and carried by supporting legs 16, said base being provided further with a plurality of members 17 extending inwardly and downwardly and connected with a centrally depressed portion 18 as illustrated in Fig. 2. A bearing member 19 extends upwardly from the portion 18 in registry with the centre thereof and is formed with an upwardly continuing reduced neck 20 and with an axial passage 21, the upper end of which is preferably of relatively increased diameter and internally screw-threaded to receive a guide cap 22. The latter is constructed with an axial opening in registry with the passage 21, said opening in the illustrated example, having a reduced diameter, the purpose of which will appear more fully hereinafter.

A plurality of brackets 23 are located at regularly spaced intervals upon the base 15 and are secured thereto in any suitable manner as by means of bolts 24, said brackets 23 being formed with integral upwardly extending housings 25 which, as shown in Fig. 2, preferably incline inwardly. In the preferred construction, a pair of gears 26 and 27 in mesh with each other are journalled in each housing 25, the shaft of each gear 26 being continued inwardly beyond its housing and being connected with a spool or thread carrier 28 having opposite end members 29 and 30, as shown in Fig. 6. An arm 31 is pivotally connected at 32 with the end member 30 and carries a stud 33 upon which the spool 34 is rotatably mounted so as to permit its thread to be unwound therefrom; at its upper end each stud 33 is formed with a recess 35 internally screw-threaded for the accommodation of a bushing 36 in which a plunger 37 is slidably mounted. The latter is maintained in and returned to its normal position by means of a spring 38 located in the recess 35 and by co-operation with an aperture 39 in the end member 29 serves to lock the stud 33 and spool 34 in operative position upon the spool carrier 28. By depressing the plunger 37 out of the aperture 39 against the tension of the spring 38, the spool or thread carrier 28 is released and may be swung to the dotted position in Fig. 6 to permit the removal of an empty spool 34 and the substitution of a new supply of thread 40. To facilitate the depression of the plunger 37 the end member 29 may be provided with a spring 41 having a projection 42 in registry with the aperture 39 and adapted to engage the plunger 37 when the latter is in its operative position. The spring 41 may be continued in the form of a resilient finger 43 arranged to lie over an opening 44 formed in the end member 29 and through which the thread 40 is guided to the braiding point; in such case the finger 43 constitutes a tension device for maintaining the thread 40 under proper tension. In order to reduce friction to a minimum the shafts of the gears 26 and 27 may be journalled in suitably arranged ball bearings 45. It will be understood that the arrangements described are duplicated in each spool carrier and housing.

Arms 46 preferably comprising integral parts of the housing 25 extend inwardly therefrom and constitute supports for a circular track 47, a co-operating track 48 being arranged concentrically within the track 47 in spaced relation thereto, as shown in Fig. 2 and being carried by arms 49. The latter comprise preferably integral parts of and extend radially outward from a collar 50 which is fixed upon the neck 20 of the bearing member 19 in any suitable manner as by means of one or more set screws 50$^a$. A plurality of spool or thread carriages 51 are located upon the tracks 47 and 48 and are supported thereon by means of wheels 52 and 53 preferably formed with transversely rounded peripheries and journalled upon axles 54 and 55 respectively, the latter projecting from end members 56 and 57 extending upwardly from opposite ends of the carriages 51. Suitably arranged ball bearings 58 may be provided for reducing the friction between the wheels 52 and 53 and their respective axles. Each spool or thread carriage further includes an arm 59 pivotally connected at 60 to the end member 56 and in its normal position lying in surface engagement therewith, as shown in Fig. 8. A stud 61 projects from the arm 59 and serves as a support for the spool 62 which may be frictionally secured thereon and in addition may be held against unintentional removal from said stud 61 by means of a screw 63 located at the free end thereof and having a head which projects peripherally beyond said stud as shown in Fig. 8 or which may be held upon said stud 61 by the action of the screw 63 alone. With this arrangement the stud and arm are held in their operative positions by gravity and may be swung on the pivot 60 to a position in which a spool may be readily removed from and placed upon the stud 61. The axle 55 of the wheel 53 is provided with an axial passage 64 through which the thread 65 passes from a spool 62 to the central point of the machine at which the braiding is being done.

The carriages 51 may each be provided with an armature 66 located in registry with and within the field of magnetic activity of electro-magnets 67 or said carriages may be made, for instance, of steel, in which case the armatures 66 may be dispensed with, the electro-magnets 67 in either case maintaining said carriages in a predetermined spaced arrangement and in fixed spaced relation to each other and, in the form being described, acting also as driving means whereby said carriages are driven in a common circular path upon the tracks 47 and 48 in the manner and for the purpose to be more fully set forth hereinafter. The armatures 66, if included in the construction may be secured upon the carriages 51 by means of screws 68 so as to depend therefrom in registry with but spaced from the free ends of the cores of the electro-magnets 67, the latter being arranged in pairs or in any number which may be required upon supporting members 69 extending radially outward from a sleeve 70 preferably as integral parts thereof. The use of steel in the construction of the carriages, or armatures 66 if these are included, and in the cores of the electro-magnets 67, is preferred for the reason that this metal, once magnetized, becomes a substantially permanent magnet. The cores of the electro-magnets 67 may, for the same reason, comprise soft iron capped with steel if this is preferred. Suitable insulation 71 is located between each pair of electro-magnets 67 and the member 69 which carries them. The sleeve 70 is rotatably mounted upon the bearing member 19, friction being reduced to a minimum by the inclusion of properly located ball bearings 72, as shown in Fig. 2. An annular rack 73 is mounted and secured upon the members 69 at the outer ends thereof and meshes with the gears 27 to drive the same as will be more fully described further on in the description. Any suitable means may be provided for rotating the sleeve 70 and with it the electro-magnets 67 and annular rack 73 upon the bearing member 19; for instance, as shown in Fig. 2, the sleeve 70 at an intermediate point may be constructed in the form of a pulley 74 for the accommodation of a driving belt operatively connected with any well known type of engine.

As illustrated in Fig. 5, the electro-magnets 67 are electrically connected in series by means of wires 75, the terminal electro-magnets wherever they may be in the series, being connected by means of wires 76 and 77 with commutator rings 78 and 79, respectively. The latter in the illustrated example shown in Fig. 2, are mounted upon the members 69 and are electrically insulated therefrom by means of suitable insulation 80; said commutator rings 78 and 79, in the operation of the machine, travel in contact with stationary brushes 81 and 82 respectively, the latter being suitably mounted in the machine and being carried, for instance as shown, by a support 83 extending upwardly from and secured to the portion 18 of the base 15. The brushes 81 and 82 are insulated from the support 83 by means of insulation 84 and are connected with a source of electrical energy in the customary manner by means of wires 85 and 86.

The machine preferably includes further a feeding mechanism whereby the finished product is fed along, this mechanism in the illustrated example shown in Fig. 2 comprising a peripherally grooved wheel 87 carried by a shaft 88 which is rotatably mounted in brackets 89 depending from the portion 18 of the base 15, the peripheral groove of said wheel 87 registering with the axis of the passage 21 in order to prevent undue angular strain on the product as it is being fed through the machine. The wheel 87 is rotated, for instance, through the medium of a gear wheel 90 mounted upon the shaft 88 and meshing with a cooperating gear wheel 91 secured upon a shaft 92. The latter is journalled in bearings 93 located upon the base portion 18 and carries a worm pinion 94 which meshes with a worm gear 95 preferably, though not necessarily, comprising an integral part of the sleeve 70. The arrangement, in addition, may include a pair of tension rollers 96 rotatably secured upon an arm 97 and adapted to exert an equal yielding pressure upon the product at the wheel 87. The arm 97 is pivoted at 98 upon one member 99 of a bell crank lever pivoted at 100 upon a bracket 101 depending from and secured to the base portion 18; the other member 102 of the bell crank lever is provided with a counter-weight 103 which is adjustable thereon and is held in an adjusted position in any suitable manner either by friction or through the medium of suitable fastening means.

As shown in Fig. 8, the armature 66 at one end carries a rod 103 extending upwardly and having its free end in registry with, or a little above, the thread passage 64 and supporting a member 104 of non-magnetic material, such as brass slotted at 105 and serving as a carrier for a screw 106 or other element of magnetizable material which rests upon said end of the rod 103. By reason of the fact that the armature 66 and with it the rod 103 becomes magnetized during energization of the electro-magnets 67 the screw 106, or its equivalent, and with it the member 104, is drawn against the end of the rod 103. The thread 65 which passes between the rod 103 and screw 106 before it reaches the passage 64 is thus maintained under a continuous tension; the same result may be obtained by constructing and utilizing the member 104 simply as a weight.

In describing the operation of the machine so far described, it will be assumed that it is being used to apply a braided cover to an electrically insulated wire, it being understood that this is only an example and that the machine is equally well adapted for other braiding and weaving purposes including the production of tubular weaving.

In operation power is applied, for instance, by means of a belt to drive the pulley 74 whereby the sleeves 70 is rotated upon the ball bearings 72 and about the bearing member 19. This brings about an actuation of the wheel 87, through the medium of the worm gear 95, worm wheel 94 and gears 91 and 90, whereby the wire 107, which has been previously passed through the cap 22 and passage 21 is fed therethrough, it being understood that the threads 40 and 65 have all been connected with said wire in any well known and convenient way. The tension wheels 96 under the influence of the weight 103 cause the wire 107 to be maintained in proper frictional contact with the wheel 87, to insure the desired feed through the machine. The actuation of the sleeve 70 also brings about a rotation of the members 69 and thereby causes the electro-magnets 67 to be likewise moved, the latter because of their magnetic influence upon the armatures 66, carrying the thread carriages 51 along and causing said carriages 51 to travel behind each other in a circular path upon the tracks 47 and 48. In this way the threads 65 are continuously moved in a predetermined path about the wire 107 as a centre. At the same time, through the medium of the annular rack 73 which partakes of the rotative travel of the members 69 and sleeve 70, the gears 27 and 26 are rotatably driven and bring about a rotation of the carriers 28 and the spools 34 about the axis of the gears 26. The threads 40 are thereby caused to describe circular paths having the axes of said gears 26 as centres at one end and the braiding points as centres at the other ends, and passing through the horizontal plane in which the threads 65 travel in circular paths. In other words, the threads 40 are carried around the carriages 51, the arrangement, dimensions and locations of the parts being such that when the carriers 28 have been rotated through arcs of 180° from the positions shown in Figs. 2 and 6, the thread openings 44 will be slightly below the level of the tracks 47 and 48 so that the threads 40 will lie across the tracks 47 and 48 and span the same under a tension whereby the wheels 52 and 53 will readily ride over the threads, the space between the cores of the electro-magnets 67 and the armatures 66 permitting the passage of the carriages 51 without interference with said threads 40. In other words the carriages 51 pass beneath and over the threads 40 in predetermined sequence, depending upon the character of the braiding, and carry the threads 65 with them so that the threads 40 and 65 are securely and efficiently braided together about the wire 107. The threads 40 ofttimes being led from the spools 34 as double strands, the rotative movements of the carriers 28 will twist said strands and thereby increase the tensile strength of said threads 40. The use of the gears 27 is desirable to cause the threads 40 to travel in directions opposite to the travel of the carriages 51 so that said threads are swept beneath said carriages whereby the danger of obstruction to the passage of said threads is reduced to a minimum. By providing the wheels 52 and 53 with the previously mentioned transversely rounded peripheries, all shearing action on the threads and on the tracks is avoided and the wheels travel easily upon single peripheral lines thus reducing friction to a minimum.

The studs 61 are so located upon the carriages 51 that the weight of said studs plus that of the spools 62 and the thread carried thereby will, by gravity, keep the armatures down in their intended positions and cause the wheels 52 and 53 to travel around on the tracks 47 and 48 whereby cutting of the threads from this cause is also avoided. The speed at which the wire 107 is fed through the machine determines the closeness of the braiding or whether it is straight or diagonal; that is to say, the higher the rate of speed at which the wire is fed along, the more open or diagonal the braiding, and conversely, the slower the feed of said wire, the more closely or straight will the threads be braided together.

In the form shown in Figs. 11 and 12, the annular rack 13$^a$, instead of being rotatable as is the rack 73 in Fig. 2, is stationary and is carried by brackets 23$^a$ similar to the brackets 23 and likewise secured upon the base 15. The housings 25$^a$ which correspond to the housings 25, on the other hand, are mounted upon members 69$^a$ which, similarly to the members 69 comprise integral parts of a sleeve 70$^a$ journalled upon the bearing member 19$^a$. The housings 25$^a$ contain gears 26 and 27, the former of which have their axles extended inwardly beyond the housings and secured to the carriers 28 which may be of the same construction as in the form first described and which likewise carry the spools 34 from which the threads 40 pass to the braiding point. The electro-magnets 67$^a$ in the present instance, are carried by members 69$^b$ projecting radially outward from a secondary sleeve 70$^b$ which is also rotatably mounted upon the bearing member 19$^a$, the latter being suitably shaped to properly support the secondary sleeve 70$^b$ above the main sleeve 70$^a$, as shown in Fig. 11. Ball bearings 72$^a$ may be provided at proper points between the secondary sleeve 70$^b$ and the bearing member 19$^a$ in order to reduce friction to a minimum. The tracks 47$^a$ and 48$^a$ in this form are also stationary and are carried by arms 46$^a$ and 49$^a$ respectively, said arms being rigidly secured to the bearing member 19$^a$ in any suitable manner. The carriages 51 and the elements combined therewith and carried thereby are the same as in Fig. 2 and likewise travel in a common circular path in the same general relative arrangement upon the tracks 47$^a$ and 48$^a$, the threads 65 being led from said carriages to the braiding point in the same manner. The members 69$^a$ and 69$^b$ are provided with annular racks 108 and 109 respectively which are in operative connection with pinions 110 journalled upon studs 111, the latter being secured to and projecting outwardly from the bearing member 19$^a$ as shown in Figs. 11 and 12. It will, of course, be understood that the electro-magnets 67$^a$ are connected with a source of electrical energy as in the form first described or in any other well-known and suitable manner.

As power is applied to rotate the sleeve 70$^a$ upon the bearing member 19$^a$, for instance, through the medium of a suitable belt co-operating with the pulley 74, the members 69$^a$ and with them the housings 25$^a$ will be driven in a circular path. At the same time, because of the rolling engagement of the gears 27 with the stationary annular rack 73$^a$, the carriers 28 and spools 34 mounted thereon will be rotated through the medium of the gears 26 about the axes of the latter. Coincidentally with the above operations, the pinions 110 by means of the racks 108 and 109 transmit circular motion to the members 69$^b$ and electro-magnets 67$^a$ and thereby by means of the electro-magnetic effect upon the armatures causes the carriages 51 and the elements carried thereby including the threads 65, to be actuated in the same way as in the form first described.

Because of the location of the pinions 110 between the annular racks 108 and 109, the carriers 28 and the carriages 51 travel in opposite directions over circular paths, the operation of the machine and the braiding of the threads upon the wire 107 being otherwise the same as in the form illustrated in Figs. 1 and 2.

In the embodiment of the invention illustrated in Figs. 13 and 14, the housings 25$^a$ with the gears 26 and 27 mounted therein and carrying the carriers 28 and the elements associated therewith are movable over the stationary rack 73$^a$ in the same way as in Figs. 11 and 12. The difference between the form now being described and those previously described resides in the fact that the track 47$^b$ is connected with the members upon which the housings 25$^a$ are secured while the track 48$^b$ is connected with the track 47$^b$ by cross-pieces 112 and is carried upon members 49$^b$ extending radially outward from a sleeve 50$^a$ rotatable about a reduced portion of the bearing member 19. Ball bearings 113 may be provided at the necessary points to reduce friction. The electro-magnets 67$^b$ in this form are stationary and are located upon members 69$^c$ which are rigidly secured upon the bearing member 19. The carriages 51 and the elements connected therewith are mounted upon the tracks 47$^b$ and 48$^b$ in the same way as in the other forms and are constructed in the same way, the armatures 66 thereof being within the magnetic field of the electro-magnets 67$^b$.

Thus, as the machine in the form under discussion is operated, the carriers 28 and parts with the threads 40 will be actuated as in the form shown in Figs. 11 and 12 while the tracks 47$^b$ and 48$^b$ are carried in circular paths beneath the carriages 51 and simply revolve the wheels 52 and 53, the carriages 51 and with them the threads 65 being held stationary by the action of electro-magnets 67$^b$ which themselves are stationary in this form. Otherwise this form is constructed and operates in the same way as those previously described herein.

In all forms of the machine the number of carriages 51 may equal the number of carriers 28 or the number may be predetermined with respect to the nature of the type of braiding which is desired and may thus be more or less than the number of carriers. Similarly, the operation of the carriages or of the carriers with respect to each other may be such that the threads 40 are alternately carried under and over successive threads 65 or the timing may be arranged for any other arrangement desired, this also depending on the nature of the braid desired.

The carriages 51 are maintained in their intended relative arrangement even when the machine is at rest, because of the wholly or partly steel covers of the magnets or the steel of the armatures or of the carriages, in the absence of armatures, or any of them, by the action of the electric magnets become substantially permanent magnets and thus exert their magnetic influence even after the electric current through the coils has been discontinued.

It will be understood that suitable pressure is made for the proper lubrication of all parts of the machine wherever this is necessary. Suitable means, for instance, in the form of a shield 107$^a$ may be included in the machine for protecting the finished product from oil drippings and the like during its passage through said machine.

The machine in all of its forms is simple in construction and efficient in operation and may be effectively utilized for braiding upon wire, tubing and upon any other elements which it may be desired to cover, and is also adapted for efficiently braiding tubular articles such as tubular shoe laces and the like.

The machine thus provides an arrangement of mechanisms in which a maximum number of different braiding operations are possible and in which the customary sinuous movements of parts are entirely avoided and replaced by what may be termed continuous rolling movements, thereby reducing the complexity of the construction and friction to a minimum.

It will be understood that the term "braiding" is used herein in a broad sense and that it is intended to include weaving whenever the product of the operations of the machine may be designated by this latter term.

Various changes in the specific forms shown and described may be made within the scope of the claims without departing from the spirit of the invention.

I claim:

1. In a braiding machine, two series of separated spools, the spools of each series being adapted to carry threads, all of the threads being directed to a braiding point, one of the series of spools being adapted to move in a circular path, the threads carried thereby moving in a sinuous path and during a portion of such sinuous movement approaching the other series of spools, the other series of spools being mounted on anti-friction supporting means resting upon a track, the thread from the first series of spools coming in contact with the said anti-friction means, said anti-friction means revolving and thereby permitting the threads of the second series of spools to be swept forcibly between said anti-friction means and said track, said anti-friction means being supported only from beneath, the space between said first series of spools and said second series of spools being entirely clear and unobstructed.

2. In a braiding machine, in combination, two separate and spaced series of spools, one of said series of spools carrying threads adapted to move in a circular and sinuous path and directed toward a braiding point, the second series of spools carrying threads also directed toward the braiding point, the second series of spools being carried by anti-friction supports which define the lowermost dip of the threads carried by the first series of spools, the threads carried by the first series of spools being adapted to be forced and carried beneath said anti-friction supports as said supports revolve, said anti-friction means being supported only from beneath, the space between said first series of spools and said second series of spools being entirely clear and unobstructed.

3. In a braiding machine, in combination, a braiding point, a track around said braiding point, a series of thread carrying carriages mounted upon anti-friction devices resting upon said track, a series of carriers spaced from said carriages and around said track and carrying threads, the threads of both carriages and carriers being adapted to be fed to said braiding point and the said carriers being adapted to be carried around said braiding point in a circular path and during the lowermost dip thereof to sweep and force the thread between said track and the said anti-friction devices, whereby the threads carried by the carriers and carriages are braided together and electro-magnets to retain said anti-friction devices upon said track.

4. In a braiding machine, in combination, a braiding point, a track around said braiding point, a series of anti-friction supports normally resting upon said track and carrying a series of spools adapted to have thread fed therefrom to the braiding point, a series of spool carriers located about said braiding point and outside of said spool supports and adapted to revolve about said braiding point and to have the thread carried thereby fed to said braiding point, the said spool carriers during their revolution about said braiding point moving the thread through a sinuous path and during a dip in said sinuous path sweeping the thread between said track and one of said anti-friction supports, whereby the threads are braided, said anti-friction means being supported only from beneath, the space between said first series of spools and said second series of spools being entirely clear and unobstructed and electro magnets to retain said anti-friction devices upon said track.

5. In a braiding machine, in combination, a braiding point, an annular toothed rack spaced from said braiding point, a series of gears on said rack and supported to revolve thereon and travel around said braiding point, a spool carrier connected with the gear supported on said track and adapted to revolve therewith during the annular travel thereof, said spool carriers being adapted to have thread fed therefrom to said braiding point and to carry the thread through a sinuous path around said braiding point, a second series of spool carriers located between said braiding point and said gears, said second series of spool carriers being mounted upon anti-friction supporting devices, said anti-friction devices resting upon a track, said second series of spool carriers being adapted to have thread fed therefrom to the braiding point, the first mentioned spool carriers being adapted during the dip of the thread carried thereby to sweep the thread forcibly between said track and one of said anti-friction devices whereby the threads are braided.

6. A braiding machine comprising a plurality of upwardly extending housings, thread carriers journalled thereon, gears within said housings whereby said carriers are rotatably actuated, means for operating said gears, a pair of annular tracks located concentrically one within the other, a plurality of thread carriages located on said tracks and electro-magnets controlling said carriages and the operation thereof with respect to the carriers.

7. A braiding machine comprising a support, a bearing member extending upwardly therefrom, a plurality of housings projecting upwardly from said base, thread carriers journalled thereon, gears within said housings whereby carriers are rotatably actuated, a pair of annular tracks located concentrically one within the other, a plurality of thread carriages mounted on said tracks, means rotatably mounted on said bearing member, an annular rack carried by said means and meshing with said gears and electro-magnets mounted on said means and controlling said carriages whereby the latter are caused to travel over said tracks as said means is rotated.

8. A braiding machine comprising a support, a bearing member extending upwardly therefrom, an annular rack secured upon said support, stationary annular tracks located concentrically one within the other, a carrying device rotatably mounted on said bearing member and arranged to be rotatably actuated, a plurality of housings extending upwardly from said carrying device, thread carriers rotatably mounted upon said housings, gears within the latter operatively connected with said carriers and in mesh with said rack, a plurality of thread carriages mounted on said tracks, a second carrying device rotatably mounted on said bearing member, electro-magnets carried by said second carrying device and controlling said carriages and means for rotating said second carrying device in a direction opposite to that of the first device whereby said carriages, under the influence of said electro-magnets are caused to travel over the tracks in a direction opposite to that of the housings and carriers over the annular rack.

9. A braiding machine comprising a support, a bearing member extending upwardly therefrom, an annular rack secured upon said support, a carrying device journalled upon said bearing member and rotatable about the same, a plurality of housings carried by said device, thread carriers journalled upon said housings, gears within the latter operatively connected with said carriers and meshing with said rack, a pair of annular tracks connected with said carrying device and partaking of the movements thereof, a plurality of thread carriages mounted upon anti-friction devices resting upon said tracks and stationary electro-magnets controlling said carriages and holding them in fixed positions as said tracks travel beneath the same in partaking of the movement of the housings and carrying device.

10. A braiding machine comprising a pair of tracks located concentrically within each other, a series of thread carriages mounted upon anti-friction devices resting upon said tracks, a series of thread carriers located about the braiding point, at least one of said series travelling in a predetermined continuous path and means whereby said carriers are individually actuated to forcibly pass the threads carried by said carriers under said anti-friction devices, the threads coming in contact with said anti-friction devices and sweeping over the upper surface of said track and electromagnets to retain said anti-friction devices upon said tracks.

In testimony whereof I have hereunto set my hand.

ALEX WENDELBURG.